UNITED STATES PATENT OFFICE.

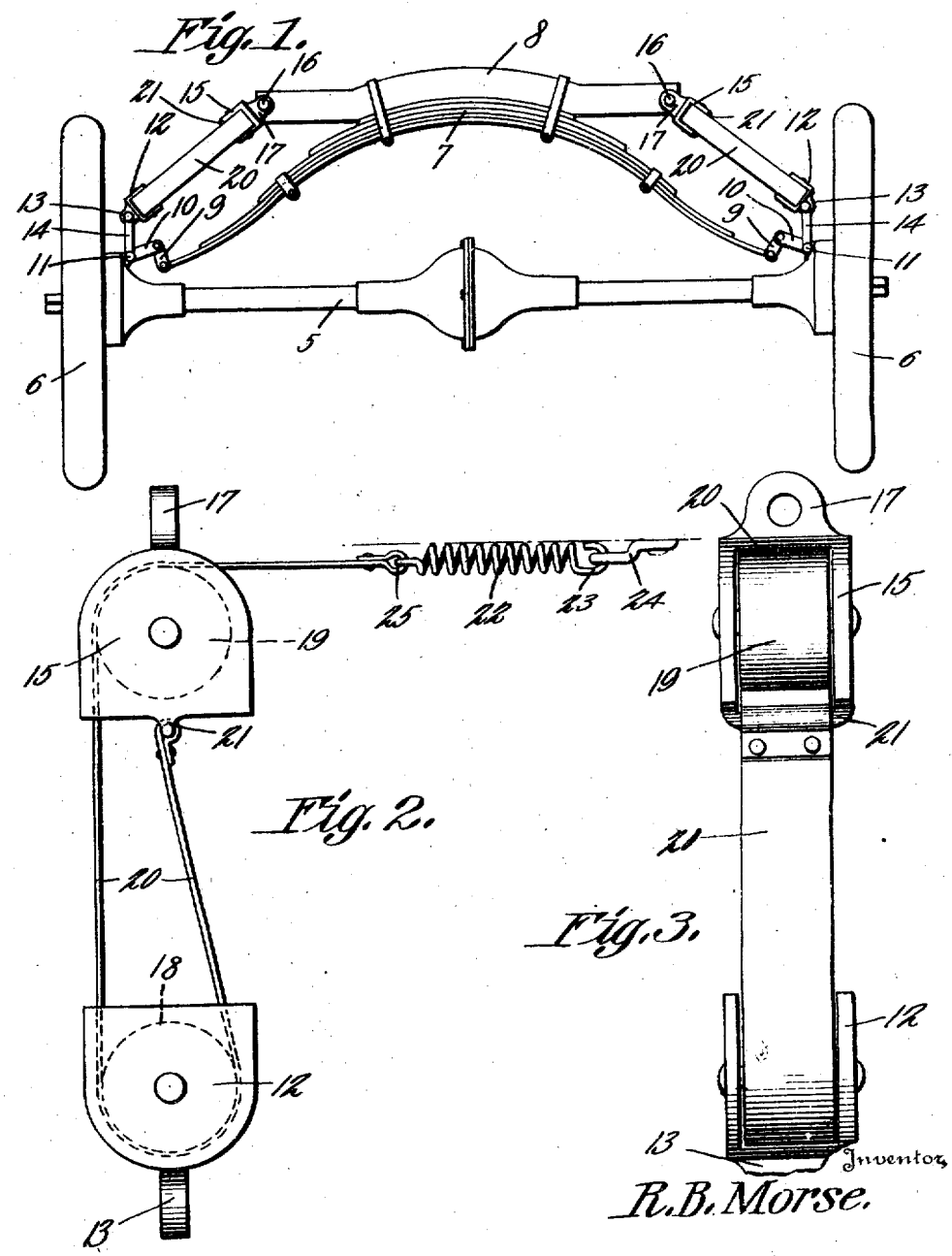

ROBERT B. MORSE, OF SOUTHPORT, NORTH CAROLINA, ASSIGNOR OF ONE-FOURTH TO THOMAS H. LINDSEY AND ONE-FOURTH TO WILLIAM C. MANSON, BOTH OF SOUTHPORT, NORTH CAROLINA.

SHOCK ABSORBER AND STABILIZER.

1,405,541.  Specification of Letters Patent.  Patented Feb. 7, 1922.

Application filed July 5, 1921. Serial No. 482,432.

*To all whom it may concern:*

Be it known that I, ROBERT B. MORSE, a citizen of the United States, residing at Southport, in the county of Brunswick and State of North Carolina, have invented a new and useful Shock Absorber and Stabilizer, of which the following is a specification.

This invention relates to shock absorbing devices, and more particularly to a shock absorber to be employed in connection with motor vehicles, or the like, it being understood however that absorbers of this character may be made relatively large to be applied to railway rolling stock.

The primary object of the invention is to provide a device which will act on the rebound of the spring to equalize the reverse action of the spring and relieve the spring of undue strain directed thereto.

A further object of the invention is to provide a device of this character to be positioned at an angle to the perpendicular so that the same will act as a stabilizer to insure against lateral movement of the vehicle.

A still further object of the invention is to provide a device of this character which may be readily and easily applied, and one which will not require the altering of the construction of the vehicle or rolling stock to which the same is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a rear elevational view of a chassis of a vehicle disclosing a shock absorber constructed in accordance with the present invention as applied thereto.

Figure 2 is an elevational view of the shock absorber.

Figure 3 is a front elevational view of the device.

Referring to the drawing in detail, the reference character 5 designates the rear axle housing of a motor vehicle, which houses the usual power axle of a vehicle, the wheels 6 being mounted on the ends of the axle in the usual manner.

The spring 7 with which the absorbing device is associated has connection with the end rail 8 of the chassis of the vehicle, and has its ends connected to the axle housing as by means of the shackles 9 which have connection with one arm of the bell crank lever 10, the bell crank lever having pivotal connection with the axle housing as at 11.

The shock absorber includes a pulley housing 12 which has an ear 13 formed integral therewith, which ear is provided with an opening to accommodate a bolt for securing the pulley housing 12 to the arm 14 of the bell crank lever 10. Associated with the pulley housing 12 is a pulley housing 15 that has connection with the end rail 8 of the chassis of the vehicle, as at 16, the pulley housing 15 being also provided with an ear indicated at 17 through the medium of which the connection with the end bar 8 of the chassis is made.

Disposed within the pulley housings, are the pulleys 18 and 19 respectively, over which pulleys the flexible band 20 operates, the flexible band 20 having one end thereof secured to the pulley housing 15, as by means of the eye 21 formed on the pulley housing 15.

A coiled spring 22 forms a part of the absorber and has one end formed into a hook member 23 to be positioned within the keeper 24 that is bolted to the chassis of the vehicle, along one of the side rails thereof. As shown, the flexible band 20 has connection with one end of the coiled spring 22 as at 25, so that movement of the flexible band 20, results in a relative movement of the spring member 22 to expand or permit the spring to retract.

In applying the device, the pulley housing 15 is secured to the chassis adjacent to the spring, while the pulley housing 12 is secured to one arm of the bell crank lever 10, the band 20 is passed over the pulleys, and one end of the spring 22 is secured to the chassis of the vehicle.

It is obvious that as the main spring 7 of the vehicles moves downwardly, the coiled spring 22 retracts to draw the flexible band 20 over the pulley, but when the spring 7 rebounds, or moves to its normal position, the bell crank lever 10 is rocked to place the spring 22 under tension thereby restricting movement of the spring 7 on its rebound.

It is to be understood that while I have shown and described the invention as applied to the rear axle of the motor vehicle, the same may be applied to either the front or rear axle of the vehicle, and it may be sufficiently large to permit its use in connection with railway rolling stock.

It might be further stated that the device may be positioned on the axles of a vehicle in any convenient location, and I do not wish to be restricted to the exact position as disclosed by the drawings.

Having thus described the invention, what is claimed as new is:—

1. In combination with the chassis and axle housing of a motor vehicle, a bell crank lever pivotally connected with the axle housing, a spring member secured to the chassis and having one end pivotally connected to one arm of the bell crank lever, a pulley supported by one arm of the bell crank lever, a pulley having connection with the chassis, a flexible band connected to the chassis, adjacent to one of the pulleys, and having its intermediate portion operating over the pulleys, and resilient means having connection with one end of the flexible band for moving the flexible band over the pulleys.

2. In combination with the chassis and axle housing of a motor vehicle, bell crank levers connected to the axle housing, a main spring having its ends connected to one of the arms of the bell crank levers, flexible members having connection with the chassis and having connection with the opposite arm to the bell crank levers, and coiled springs for normally holding the flexible members against movement.

In testimony that I claim the foregoing as my own, I have hereto affixed my signature in the presence of two witnesses.

ROBERT B. MORSE.

Witnesses:
E. L. BURRISS,
H. W. HOOD.